United States Patent [19]
Fujinami

[11] Patent Number: 4,781,273
[45] Date of Patent: Nov. 1, 1988

[54] DISC BRAKE CALIPER SUPPORT STRUCTURE

[75] Inventor: Hideyuki Fujinami, Saitama, Japan

[73] Assignee: Akebono Brake Industry Co., Ltd., Tokyo, Japan

[21] Appl. No.: 938,242

[22] Filed: Dec. 5, 1986

[30] Foreign Application Priority Data

Dec. 5, 1985 [JP] Japan .................... 60-272583

[51] Int. Cl.⁴ .................................. F16D 65/02
[52] U.S. Cl. .................... 188/73.42; 188/73.45
[58] Field of Search ........... 188/73.42, 73.43, 73.44, 188/73.45, 59

[56] References Cited

U.S. PATENT DOCUMENTS

| | | | |
|---|---|---|---|
| 2,784,811 | 3/1957 | Butler | 188/73.43 |
| 3,656,590 | 4/1972 | Newstead | 188/73.45 |
| 4,084,665 | 4/1978 | Burnett | 188/73.45 |
| 4,084,666 | 4/1978 | Karasudani | 188/73.45 |
| 4,301,895 | 11/1981 | Harrison et al. | 188/59 |
| 4,392,560 | 7/1983 | Nakasu et al. | 188/73.45 X |
| 4,458,790 | 7/1984 | Hoffman, Jr. et al. | 188/73.44 X |
| 4,557,354 | 12/1985 | Sakakibara | 188/73.45 |

FOREIGN PATENT DOCUMENTS

| | | | |
|---|---|---|---|
| 2931804 | 4/1981 | Fed. Rep. of Germany | 188/73.44 |
| 10837 | 2/1981 | Japan | 188/73.45 |

*Primary Examiner*—George E. A. Halvosa
*Attorney, Agent, or Firm*—Finnegan, Henderson, Farabow, Garrett & Dunner

[57] ABSTRACT

A disc brake caliper support structure is disclosed which comprises a rear arm forming a cylinder containing a piston for pressing a friction pad supported and guided by an anchor pin and a front arm for fixing another friction pad to make a caliper holding disc rotors with both the friction pads therebetween movable in the axial direction of guide pins by inserting a plurality of guide pins installed on the caliper in the support member fixed to a bogie frame. One guide pin and the support member are floatably coupled in such a manner as to oscillate relative to each other through a spherical bush and a spherical member, each being set in position by the support member. The other guide pin and the support member are floatingly coupled in such a manner as to oscillate relative to each other through a vibration-proof cylindrical rubber member with a cylindrical inner liner formed with rubber whose outer peripheral axial threads are sawtooth-like in the peripheral direction.

3 Claims, 3 Drawing Sheets

DISC BRAKE CALIPER SUPPORT STRUCTURE

BACKGROUND OF THE INVENTION

This invention relates to a disc brake caliper support structure for use in rolling stock or railway cars.

In rolling stock, one known arrangement is to use a disc brake applied to disc rotors fixed to both sides of a wheel as shown in FIG. 1, wherein there is shown an arrangement of a track surface 21; a wheel flange 22; disc rotors 24, 24' fixed to both sides of the wheel 23; and a disc brake caliper 1 having pairs of friction pads 6, 6' in such a manner as to embrace the wheel 22 and to face the frictional surfaces of the disc rotors 24, 24', the caliper 1 being movably supported by a support member 2 fixed to the bogie frame through an upper guide pin 3 and a lower guide pin 4; a pair of cylinders 5 formed on the rear caliper arm; and a pair of anchor pins 7 fixed to the rear caliper arm. When hydraulic oil is supplied from an outside hydraulic source (not shown) to each cylinder 5, the piston in each cylinder 5 is moved and one of the friction pads 6 mate with one of the disc rotors 24 since a back plate of the friction pads 6 is supported, guided and pushed forward by each anchor pin 7. The caliper 1 is then moved rearwardly by the reactive force of the hydraulic pressure, causing the other friction pads 6' fixed to the front arm to made with the other disc rotor 24' fixed to the opposite side of the wheel, thereby braking the wheel.

The support member 2 integrally fixed to the bogie and the disc rotors 24, 24' each fixed to the wheel are caused to move independently of each other, since a spring or suspension means for isolating or reducing vibrations is interposed between the wheel and the bogie frame of the railway vehicle. To further stabilize a braking effect and to prevent the disc rotors 24, 24' from locally wearing, the disc brake caliper 1 for use in rolling stock should be movable in the axial direction of the upper and lower guide pins 3 and 4 relative to the support member 2, whereas the direction in which the upper and lower guide pins 3 and 4 should conform with the axis of rotation of the disc rotors 24 and 24'. Referring to FIGS. 2 and 3, a caliper support structure used in a conventional disc brake for the rolling stock will be described.

FIG. 2 shows a caliper support structure with the upper guide pin 3, wherein the caliper support comprises an upper lug 1a on the rear arm side of the caliper 1, an upper lug 1b on the front arm side thereof and an upper cylindrical portion 2a of the support member 2. An annular step 2a' is provided on the inner peripheral face of the upper cylindrical portion 2a. The outer peripheral face of a single split spherical bush 8 with a spherical member 9 having a through hole 9a is fitted over the inner peripheral face of the upper cylindrical portion. One side of the spherical bush 8 is made to abut against the annular side of the annular step 2a', the other being caught by a snap ring 10, and the spherical bush 8 is set in position relative to the upper cylindrical portion 2a. The upper guide pin 3 with one end having a large diameter portion 3a and the other end having a screw means 3b is passed through the upper lug 1b on the above-mentioned front arm side, the through hole 9a of the spherical member 9 and the upper lug 1a on the rear side. The upper guide pin 3 thus passed therethrough is also tightened with a nut 3c to make the caliper 1 slidable relative to the spherical member 9.

FIG. 3 shows a caliper support structure with the lower guide pin 4, wherein the caliper support comprises a lower lug 1a' on the rear arm side of the caliper 1, a lower lug 1b' on the front arm side thereof and a lower cylindrical portion 2b of the support member 2. The outer peripheral face of a centering rubber 11 having annular projections 11a formed inwardly toward both ends thereof is mated with the center of the inner peripheral face of the lower cylindrical portion 2b. Metal bushes 12, 13 are forced and fixed onto the inner peripheral face of the lower cylindrical portion 2b for use as both sides of the centering rubber 11.

The lower guide pin 4 having one end as a large diameter portion 4a and the other as a screw means 4b is passed through the lower lug 1b' on the front arm side, the through hole formed with the annular projection 11a of the centering rubber 11 and the lower lug 1a' on the rear arm side. The lower guide pin 4 is then tightened with a nut 4c to make the caliper 1 slidable relative to the centering rubber 11.

The caliper 1 is thus movably supported by the support member 2 and, in case the axial line of rotation of both the disc rotors 24, 24' is tilted, the upper guide pin 3 is allowed to swivel on the face where the spherical member 9 and the spherical bush 8 mate with each other to follow the tilt movement of the disc rotors 24, 24', whereas the lower guide pin 4 is also caused to follow while resiliently compressing and deforming the annular projection. In consequence, both the friction pads 6, 6' are forced to a uniformly abut against the disc rotors 24, 24'.

Numeral 17 designates a dust-proof rubber boot.

In the above conventional arrangement, however, the lower guide pin 4 is allowed to contact with the outer edges 12a, 13a of both bushes 12, 13 when the upper and lower guide pins 3, 4 are largely tilted. Consequently, the caliper 1 may become unable to move relative to the support member 2.

OBJECT AND SUMMARY OF THE INVENTION

It is therefore an object of the present invention to provide a disc brake caliper support structure in rolling stock, wherein a caliper is allowed to move relative to a support member even when guide pins tilt to a large extent.

In order to attain this and other objects, according to the present invention there is provided a disc brake caliper support structure comprising a rear arm forming a cylinder containing a piston for pressing a friction pad supported and guided by an anchor pin and a front arm for fixing another friction pad to make a caliper holding disc rotors with both the friction pads therebetween movable in the axial direction of guide pins by inserting a plurality of guide pins installed on the caliper in the support member fixed to a bogie frame, said disc brake being characterized in that one guide pin and the support member 2 are floatingly coupled in such a manner as to oscillate relative to each other through a spherical bush and a spherical member each set in position by the support member, and that the other guide pin and the support member floatingly coupled in such a manner as to oscillate relative to each other through a vibration-proof cylindrical rubber member with a cylindrical inner liner formed with rubber whose outer peripheral axial threads are sawtooth-like in the peripheral direction.

DESCRIPTION OF THE PREFERRED EMBODIMENT

The present invention will now be described with reference to FIGS. 4 through 6.

Figure 4:
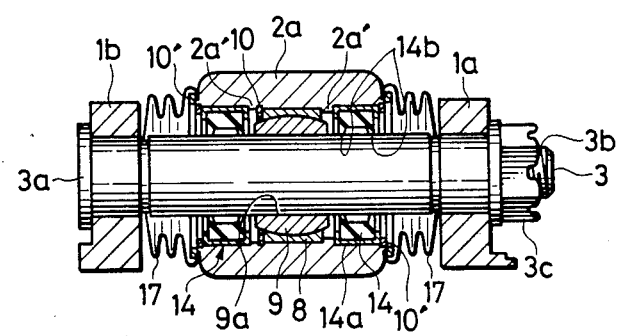
FIG. 4 is a sectional view showing a caliper support structure with an upper guide pin embodying the present invention.

FIG. 4 shows a caliper support structure with an upper guide pin 3, wherein like reference characters designate like and corresponding parts in the conventional one. In FIG. 4, there is shown an arrangement of an upper lug 1a on the rear side of a caliper 1, an upper lug 1b on the front side thereof, an upper cylindrical portion 2a of a support member 2, an annular step portion 2a', a spherical member 9 having a through hole 9a a spherical bush 8, a snap ring 10, and an upper guide pin 3 with one end having a large diameter 3a, the other being provided with a screw means 3b. On both sides of the spherical bush are pieces of centering rubber 14, each being stuck to an annular U-shaped back plate 14a in cross section including the central axial line, each having annular projections 14b inwardly directed to both sides. Each piece of centering rubber abutting against one side of the annular step 2a' formed on the cylindrical portion 2a is fixed with the snap ring 10'. The upper guide pin 3 is passed through the upper lug 1b on the front arm side of the caliper, the through-hole formed by the annular projections 14b of both pieces 14, 14 of centering rubber, the through-hole 9a of the spherical member and the upper lug 1a on the rear arm side of the caliper and tightened with a nut 3c, whereby the caliper 1 and the support member 2 are movably coupled together.

Figure 5:
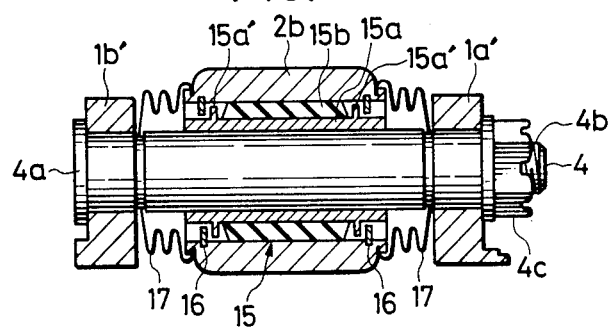
FIG. 5 is a sectional view showing the caliper support structure with a lower guide pin according to the invention.
Figure 6:
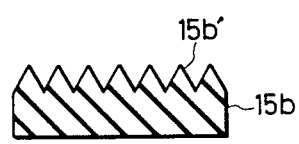
FIG. 6 is a partial sectional view of the outer peripheral face of a cylindrical vibration-proof rubber member with an inner liner for use in the embodiment of the present invention.

FIG. 5 shows a caliper support construction with a lower guide pin 4, wherein like reference characters designate like or corresponding parts in the conventional construction. In FIG. 5, there is shown an arrangement of a lower lug 1a' on the rear arm side of the caliper 1, a lower lug 1b' on the front side thereof, a lower cylindrical portion 2b of the support member 2, a lower guide pin 4 with one end having a large diameter 4a, the other being provided with a screw means 4b, and a cylindrical vibration-proof rubber member 15 with an inner liner 15a. Annular projections 15a' are provided on both ends of the inner liner 15a and rubber 15b is stuck on the outer peripheral face between the annular projections 15a'. The rubber thus stuck should preferably be synthetic rubber. On the outer peripheral face of the rubber 15b is, as shown in FIG. 6, a periphery-directed chevron structure 15b' in a sawtooth form provided in the axial direction to reduce the spring constant, the front end of the chevron structure 15b' being cause to abut against and inserted in the inner peripheral face of the lower cylindrical portion 2b. Snap rings 16, 16 are fixed to the inner peripheral face of the lower cylindrical portion 2b and, by mating with both the annular projections 15a', used to limit the movement of the vibration-proof rubber member 15. The lower guide pin 4 is passed through the lower lug 1b' on the front arm side of the caliper, the cylindrical vibration-proof rubber member 15 with an inner liner 15a and the lower lug 1a' on the rear arm side thereof and tightened with a nut 4c to floatably couple the caliper 1 and the support member 2.

Figure 1:
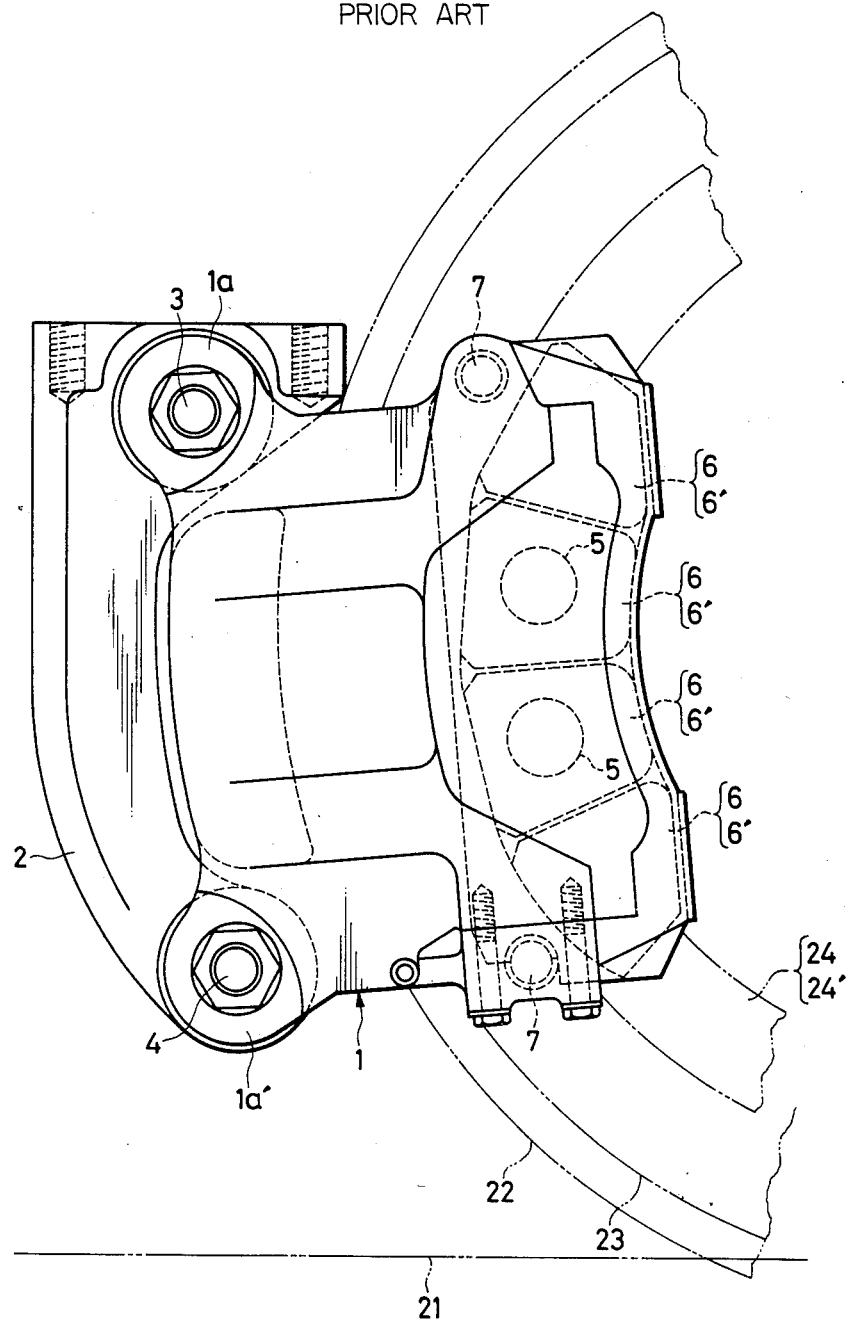
FIG. 1 is a diagram descriptive of a disc brake for use in rolling stock.
Figure 2:
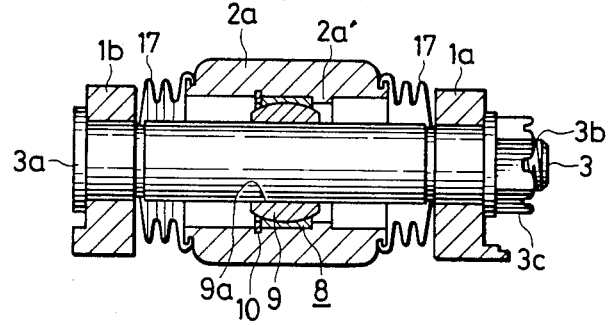
FIG. 2 is a sectional view showing a caliper support structure with a conventional upper guide pin.
Figure 3:
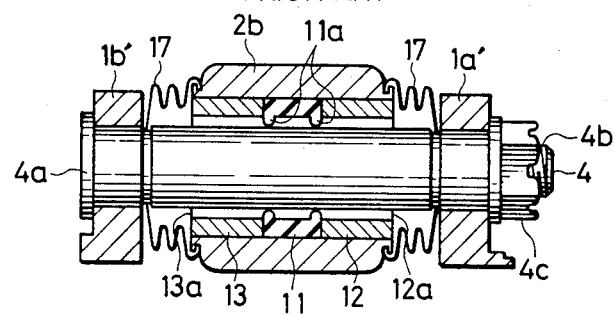
FIG. 3 is a sectional view showing the caliper support structure with a conventional lower guide pin.

As set forth above, the caliper 1 is floatably supported by the support member 2 and, as shown in FIG. 1, the cylinders 5, 5 are installed on the rear arm 1a of the caliper. One friction-pad 6 supported and guided by the pair of the anchor pins 7, 7 is made to abut against the front face of the cylinder 5, whereas the other friction-pad 6' is fixed to the front arm thereof, so that the disc rotors 24, 24' installed on both sides of the wheel are held between both the friction-pads 6, 6'. The operation will subsequently be described.

If the axial line of rotation of the disc rotors 24, 24' is tilted against the bogie frame when the brake is applied, the friction-pad 6 on the rear arm side is forced out by the piston contained in each cylinder. When the friction-pad abuts against the disc rotor 24, the upper guide pin 3 is caused to move diagonally relative to the upper cylindrical portion 2a of the support member 2 through the spherical bush 8 and the spherical member 9, whereas the lower guide pin 4 easily squashes the sawtooth-like chevrons 15b' of the cylindrical vibration-proof rubber member 15 with an inner liner 15a and moves diagonally relative to the lower cylindrical portion 2b of the support member 2 and then tilts while following the disc rotors 24, 24'. The lower guide pin 4 is thus floatably actuated relative to the support member 2, whereby both the friction-pads 6, 6' are caused to frictionally mate with the disc rotors 24, 24' to produce braking force. After the chevrons 15b' are sufficiently squashed as the lower guide pin 4 further tilts the lower guide pin 4 slides on the inner peripheral face of the inner liner 15a and the caliper 1 is floatably actuated relative to the support member 2.

When the brake is released, the axial line of rotation of the disc rotors 24, 24' is restored to the horizontal position and a center-adjusting action is performed by both pieces of centering rubber 14, 14 and the rubber 15b.

The same effect as that of the above embodiment is achievable by arranging a guide pin, supported through the spherical bush 8 and the spherical member 9, in the center position and arranging two guide pins, supported through the cylindrical vibration-proof rubber member 15 with an inner liner, above and below the first guide pin relative to the support member, i.e., by using three guide pins to floatably support the caliper 1 relative to the support member 2.

As is obvious from the above description, the following effects are achievable by the caliper support construction according to the present invention:

Even when the axial line of rotation of disc rotors installed in rolling stock tilts against the bogie frame depending on operating conditions, the guide pins supporting the caliper relative to the support member are caused to tilt in the same direction as that of tilted axial line thereof and the caliper is allowed to float effectively relative to the support member, whereby the disc rotors are prevented from eccentrically wearing off.

What is claimed is:

1. A disc brake caliper support structure for a bogie frame, comprising:
   a. a support member fixed to the bogie frame and having first and second vertically spaced-apart support holes;
   b. a disc brake caliper assembly having a pair of first lugs and a pair of second lugs, said first lugs being disposed on axially opposite sides of said first support hole in said support member and said second lugs being disposed on axially opposite sides of said second support hole in said support member;
   c. means for floatingly coupling and caliper assembly to said support member, said coupling means including:
      a first guide pin passing through said first support hole and connecting said first lugs of said caliper assembly,
      means for pivotally supporting said first guide pin in said first support hole, said first guide pin support means including a spherical bushing fixed to said support member in said first support hole and a complementary spherical member mounted on said first guide pin,
      a second guide pin passing through said second support hole and connecting said second lugs of said caliper assembly, and
      means for resiliently supporting said second guide pin in said second support hole, said second guide pin supporting means including (1) a cylindrical sleeve slidably mounted on said second guide pin and disposed in said second support hole, said sleeve having a length approximately equal to the thickness of said support member through said second support hole and having a stop portion projection radially outwardly from said sleeve at each axial end thereof (2) a cylindrical rubber member disposed radially between said sleeve and said second support hole and axially between said stop portions of said sleeve, said rubber member having an inner peripheral surface in contact with said sleeve and an outer peripheral surface in contact with the inner peripheral surface of said second support hole, said outer peripheral surface of said rubber member having a sawtooth profile in axial cross-section, and (3) retaining means, mounted to said support member in said second support hole and axially spaced from said rubber member, for engaging said stop portions of said sleeve to limit axial movement of said sleeve relative to said support member and for retaining said sleeve and said rubber member in a position between said second guide pin and said inner peripheral surface of said support hole to prevent said second guide pin from contacting said support member.

2. The disc brake caliper support structure of claim 1, wherein said retaining means includes a pair of snap rings each mounted at one axial end of said second support hole.

3. The disc brake caliper support structure of claim 1, further comprising a pair of centering rubbers disposed in said first support hole on axially opposite sides of said spherical bushing, said centering rubbers being in frictional contact with said first guide pin and restricting axial movement of said first guide pin relative to said support member, said centering rubbers and said cylindrical rubber member cooperating to bias said caliper assembly toward a centered position relative to said support member.

* * * * *